US011227218B2

United States Patent
Min et al.

(10) Patent No.: US 11,227,218 B2
(45) Date of Patent: Jan. 18, 2022

(54) QUESTION ANSWERING FROM MINIMAL CONTEXT OVER DOCUMENTS

(71) Applicant: salesforce.com, inc., San Francisco, CA (US)

(72) Inventors: Sewon Min, Palo Alto, CA (US); Victor Zhong, San Francisco, CA (US); Caiming Xiong, Mountain View, CA (US); Richard Socher, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 874 days.

(21) Appl. No.: 15/980,207

(22) Filed: May 15, 2018

(65) Prior Publication Data

US 2019/0258939 A1  Aug. 22, 2019

Related U.S. Application Data

(60) Provisional application No. 62/634,151, filed on Feb. 22, 2018.

(51) Int. Cl.
| | |
|---|---|
| *G06F 40/30* | (2020.01) |
| *G06N 20/00* | (2019.01) |
| *G06N 3/08* | (2006.01) |
| *G06N 5/04* | (2006.01) |
| *G06N 3/04* | (2006.01) |
| *G06F 40/20* | (2020.01) |

(52) U.S. Cl.
CPC ............ *G06N 3/088* (2013.01); *G06F 40/20* (2020.01); *G06F 40/30* (2020.01); *G06N 3/0445* (2013.01); *G06N 3/0454* (2013.01); *G06N 5/04* (2013.01)

(58) Field of Classification Search
CPC .... G06F 40/211; G06F 40/253; G06F 40/268; G06F 40/284; G06F 40/30; G06N 20/00
See application file for complete search history.

(56) References Cited

U.S. PATENT DOCUMENTS

| 8,121,367 B2 | 2/2012 | Socher et al. |
| 8,355,550 B2 | 1/2013 | Zhang et al. |
| 8,468,143 B1 * | 6/2013 | Oztekin ............ G06F 16/90335 707/706 |
| 10,282,663 B2 | 5/2019 | Socher et al. |

(Continued)

OTHER PUBLICATIONS

Berant et al., "Semantic Parsing on Freebase from Question-Answer Pairs," Proceedings of the 2013 Conference on Empirical Method in Natural Language Processing. Seattle, Washington. Oct. 18-21, 2013. pp. 1-12.

(Continued)

*Primary Examiner* — Lamont M Spooner
(74) *Attorney, Agent, or Firm* — Haynes and Boone, LLP

(57) ABSTRACT

A natural language processing system that includes a sentence selector and a question answering module. The sentence selector receives a question and sentences that are associated with a context. For a question and each sentence, the sentence selector determines a score. A score represents whether the question is answerable with the sentence. Sentence selector then generates a minimum set of sentences from the scores associated with the question and sentences. The question answering module generates an answer for the question from the minimum set of sentences.

20 Claims, 9 Drawing Sheets

(56) References Cited

U.S. PATENT DOCUMENTS

| | | | |
|---|---|---|---|
| 10,346,721 | B2 | 7/2019 | Albright et al. |
| 10,705,796 | B1* | 7/2020 | Doyle ................. G06F 7/08 |
| 2016/0232443 | A1* | 8/2016 | Fan ..................... G06N 3/08 |
| 2016/0232444 | A1* | 8/2016 | Fan ..................... G06N 3/04 |
| 2016/0350653 | A1 | 12/2016 | Socher et al. |
| 2017/0024645 | A1 | 1/2017 | Socher et al. |
| 2017/0032280 | A1 | 2/2017 | Socher et al. |
| 2017/0140240 | A1 | 5/2017 | Socher et al. |
| 2018/0082171 | A1 | 3/2018 | Merity et al. |
| 2018/0096219 | A1 | 4/2018 | Socher |
| 2018/0096267 | A1 | 4/2018 | Masekara et al. |
| 2018/0114108 | A1* | 4/2018 | Lao ..................... G06N 3/006 |
| 2018/0121787 | A1 | 5/2018 | Hashimoto et al. |
| 2018/0121788 | A1 | 5/2018 | Hashimoto et al. |
| 2018/0121799 | A1 | 5/2018 | Hashimoto et al. |
| 2018/0129931 | A1 | 5/2018 | Bradbury et al. |
| 2018/0129937 | A1 | 5/2018 | Bradbury et al. |
| 2018/0129938 | A1 | 5/2018 | Xiong et al. |
| 2018/0143966 | A1 | 5/2018 | Lu et al. |
| 2018/0144208 | A1 | 5/2018 | Lu et al. |
| 2018/0144248 | A1 | 5/2018 | Lu et al. |
| 2018/0150743 | A1* | 5/2018 | Ma ..................... G06N 3/0445 |
| 2018/0268287 | A1 | 9/2018 | Johansen et al. |
| 2018/0268298 | A1 | 9/2018 | Johansen et al. |
| 2018/0300317 | A1 | 10/2018 | Bradbury |
| 2018/0300400 | A1 | 10/2018 | Paulus |
| 2018/0307687 | A1* | 10/2018 | Natkin ............... G06F 16/24578 |
| 2018/0314704 | A1* | 11/2018 | Bull ..................... G06F 40/284 |
| 2018/0336198 | A1 | 11/2018 | Zhong et al. |
| 2018/0336453 | A1 | 11/2018 | Merity et al. |
| 2018/0341871 | A1* | 11/2018 | Maitra ............... G06N 3/0427 |
| 2019/0065576 | A1* | 2/2019 | Peng ................. G06F 16/22 |
| 2019/0108432 | A1 | 4/2019 | Lu et al. |
| 2019/0108439 | A1 | 4/2019 | Lu et al. |
| 2019/0114321 | A1* | 4/2019 | Lam ..................... G06N 20/00 |
| 2019/0130206 | A1 | 5/2019 | Trott et al. |
| 2019/0130248 | A1 | 5/2019 | Zhong et al. |
| 2019/0130249 | A1 | 5/2019 | Bradbury et al. |
| 2019/0130273 | A1 | 5/2019 | Keskar et al. |
| 2019/0130312 | A1 | 5/2019 | Xiong et al. |
| 2019/0130896 | A1 | 5/2019 | Zhou et al. |
| 2019/0130897 | A1 | 5/2019 | Zhou et al. |
| 2019/0149834 | A1 | 5/2019 | Zhou et al. |
| 2019/0188568 | A1 | 6/2019 | Keskar et al. |
| 2019/0251168 | A1 | 8/2019 | McCann et al. |
| 2019/0251184 | A1* | 8/2019 | Shan ..................... G06N 3/084 |
| 2019/0251431 | A1 | 8/2019 | Keskar et al. |
| 2019/0258714 | A1 | 8/2019 | Zhong et al. |
| 2020/0265327 | A1* | 8/2020 | Kwiatkowski ........... G06N 5/04 |
| 2020/0311073 | A1* | 10/2020 | Tomita ............... G06F 16/24522 |

OTHER PUBLICATIONS

Chen et al., "ReadingWikipedia to Answer Open-Domain Questions," Association for Computational Linguistics. Vancouver, Canada. Jul. 30-Aug. 4, 2017. pp. 1-10.
Choi et al., "Coarse-to-Fine Question Answering for Long Documents," Association for Computational Linguistics. Vancouver, Canada. Jul. 30-Aug. 4, 2017. pp. 1-12.
Clark et al., "Simple and Effective Multi-Paragraph Reading Comprehension," Proceedings of the 56th Annual Meeting of the Association for Computational Linguistics (Long Papers). Melbourne, Australia. Jul. 15-20, 2018. pp. 1-11.
Dhingra et al., "QUASAR: Datasets for Question Answering by Search and Reading," arXiv preprint arXiv: 1707.03904. Available Online at: https://arxiv.org/pdf/1707.03904.pdf. Aug. 9, 2017. pp. 1-11.
Dunn et al., "SearchQA: A New Q&A Dataset Augmented with Context from a Search Engine," arXiv preprint, arXiv: 1704.05179. Available Online at: https://arxiv.org/pdf/1704.05179.pdf. Jun. 11, 2017. pp. 1-5.
Hashimoto et al., "A Joint Many-Task Model: Growing a Neural Network for Multiple NLP Tasks," Proceedings of the Conference on Empirical Methods in Natural Language Processing. Copenhagen, Denmark. Sep. 7-11, 2017. pp. 1-11.
Hermann et al., "Teaching Machines to Read and Comprehend," Twenty-Ninth Conference on Neural Information Processing Systems. Montréal, Canada. Dec. 7-12, 2015. pp. 1-14.
Hochreiter et al., "Long Short-Term Memory: Neural Computation," Neural Computation, vol. 9, Issue 8. Nov. 15, 1997. pp. 1-32.
Hu et al., "Reinforced Mnemonic Reader for Machine Reading Comprehension," Published in 27th International Joint Conference on Artificial Intelligence. Stockholm, Sweden. Jul. 13-19, 2018. pp. 1-8.
Huang et al., "FusionNet: Fusing Via Fully-Aware Attention with Application to Machine Comprehension," Sixth International Conference on Learning Representations. Vancouver, Canada. Apr. 30-May 3, 2018. pp. 1-20.
Jia et al., "Adversarial Examples for Evaluating Reading Comprehension Systems," Conference on Empirical Methods in Natural Language Processing. Copenhagen, Denmark. Sep. 7-11, 2017. pp. 1-11.
Joshi et al., "TriviaQA: A Large Scale Distantly Supervised Challenge Dataset for Reading Comprehension," Association for Computational Linguistics. Vancouver, Canada. Jul. 30-Aug. 4, 2017. pp. 1-11.
Kingma et al., "ADAM: A Method for Stochastic Optimization," Published as a Conference Paper at the International Conference on Learning Representation, San Diego, CA. May 7-9, 2015. pp. 1-15.
Kocisky et al., "The NarrativeQA Reading Comprehension Challenge," Transaactions of the Association for Computational Linguistics, vol. 6. Austin, Texas. Oct. 6-15, 2017. pp. 1-12.
Lai et al., "RACE: Large-scale ReAding Comprehension Dataset From Examinations," Conference on Empirical Methods in Natural Language Processing. Copenhagen, Denmark. Sep. 7-11, 2017. pp. 1-11.
Lee et al., "Learning Recurrent Span Representations for Extractive Question Answering," 5th International Conference on Learning Representations. Toulon, France. Apr. 24-26, 2017. pp. 1-9.
Manning et al., "The Stanford CoreNLP Natural Language Processing Toolkit," Proceedings of 52nd Annual Meeting of the Association for Computational Linguistics (ACL): System Demonstrations, Linguistics and Computer Science. Baltimore, Maryland. Jun. 2014. pp. 1-6.
McCann et al., "Learned in Translation: Contextualized Word Vectors," Advances in Neural Information Processing Systems. Long Beach, CA. Dec. 4-9, 2017. pp 1-11.
Miller et al., "Key-Value Memory Networks for Directly Reading Documents," Conference on Empirical Methods on Natural Language Processing. Austin, Texas. Nov. 1-5, 2016. pp. 1-10.
Min et al., "Question Answering through Transfer Learning from Large Fine-grained Supervision Data," Association for Computational Linguistics. Austin, Texas. Oct. 6-15, 2017. pp. 1-8.
Pan et al., "MEMEN: Multi-Layer Embedding with Memory Networks for Machine Comprehension," arXiv preprint. arXiv: 1707.09098. Available Online at: https://arxiv.org/abs/1707.09098. Jul. 28, 2017. pp. 1-7.
Pennington et al., "GloVe: Global Vectors for Word Representation," Proceedings of the 2014 Conference on Empirical Methods in Natural Language Processing. Doha, Qatar. Oct. 25-29, 2014. pp. 1-12.
Raiman et al., "Globally Normalized Reader," Conference on Empirical Methods in Natural Language Processing. Copenhagen, Denmark. Sep. 7-11, 2017. pp. 1-11.
Rajpurkar et al., "SQuAD: 100,000+ Questions for Machine Comprehension of Text," Proceedings of the 2016 Conference on Empirical Methods in Natural Language Processing. Austin, Texas. Nov. 1-5, 2016. pp. 1-10.
Richardson et al., "MCTest: A Challenge Dataset for the Open-Domain Machine Comprehension of Text," Proceedings of the 2013 Conference on Empirical Methods in Natural Language Processing. Seattle, Washington. Oct. 18-21, 2013. pp. 1-11.
Seo et al., "Bi-Directional Attention Flow For Machine Comprehension," Published as a Conference Paper at the International Conference on Learning Representations. Toulon, France. Apr. 24-26, 2017. pp. 1-13.

(56) References Cited

OTHER PUBLICATIONS

Shen et al., "ReasoNet: Learning to Stop Reading in Machine Comprehension," Proceedings of the 23rd ACM SIGKDD International Conference on Knowledge Discovery and Data Mining. Halifax, Nova Scotia, Canada. Aug. 13-17, 2017. pp. 1-9.

Srivastava et al., "Dropout: A Simple Way to Prevent Neural Networks from Overfitting," Journal of Machine Learning Research. University of Toronto. Jun. 14, 2014. pp. 1-30.

Swayamdipta et al., "Multi-Mention Learning for Reading Comprehension with Neural Cascades," Published as a Conference Paper at the International Conference on Learning Representations. Vancouver, Canada. Apr. 30-May 3, 2018. pp. 1-12.

Tan et al., "Context-Aware Answer Sentence Selection With Hierarchical Gated Recurrent Neural Networks," IEEE/ACM Transactions on Audio, Speech, and Language Processing, vol. 26, No. 3. Mar. 2018. pp. 1-10.

Trischler et al., "NewsQA: A Machine Comprehension Dataset," Proceedings of the 2nd Workshop on Representation Learning for Natural Language Processing. Vancouver, Canada. Aug. 3, 2017. pp. 1-10.

Wang et al., "R3: Reinforced Ranker-Reader for Open-Domain Question Answering," 32nd AAAI Conference on Artificial Intelligence. New Orleans, Louisiana. Feb. 2-7, 2018. pp. 1-8.

Weissenborn et al., "Making Neural QA as Simple as Possible but not Simpler," Proceedings of the 21st Conference on Computational Natural Language Learning. Vancouver, Canada. Aug. 3-4, 2017. pp. 1-10.

Weissenborn et al., "Reading Twice for Natural Language Understanding," 31st Conference on Neural Information Processing Systems. Long Beach, CA. Dec. 4-9, 2017. pp. 1-12.

Xie et al., "Large-Scale Cloze Test Dataset Designed by Teachers," Under Review as a Conference Paper at the International Conference on Learning Representations. Vancouver, Canada. Apr. 30-May 3, 2018. pp. 1-13.

Xiong et al., "DCN+: Mixed Objective and Deep Residual Coattention for Question Answering," Conference Paper at the International Conference on Learning Representations. Vancouver, Canada. Apr. 30-May 3, 2018. pp. 1-10.

Yi et al., "WIKIQA: A Challenge Dataset for Open-Domain Question Answering," Proceedings of the 2015 Conference an Empirical Methods in Natural Language Processing. Lisbon, Portugal. Sep. 17-21, 2015. pp 1-6.

Yin et al., "ABCNN: Attention-Based Convolutional Neural Network for Modeling Sentence Pairs," Transactions of the Association for Computational Linguistics. Berlin, Germany. Aug. 7-12, 2016. pp. 1-14.

Yu et al., "Fast and Accurate Text Calssification: Skimming, Rereading and Early Stopping," Workshop Track at the International Conference on Learning Representations. Vancouver, Canada. Apr. 30-May 3, 2018. pp. 1-12.

International Search Report for PCT Application No. PCT/US2019/018530, dated May 22, 2019 pp. 1-17.

Song et al., "Ruminating Reader: Reasoning with Gated Multi-Hop Attention," Apr. 24, 2017, XP055542416, pp. 1-11.

Xiong et al., "Dynamic Coattention Networks for Question Answering," Published as a conference paper at International Conference on Learning Representations (ICLR) 2017, XP055447075. Mar. 6, 2018. pp. 1-14.

* cited by examiner

QUESTION ANSWERING FROM MINIMAL CONTEXT OVER DOCUMENTS

PRIORITY APPLICATION DATA

This application claims priority to U.S. Provisional Application No. 62/634,151 filed on Feb. 22, 2018 and entitled "Question Answering from Minimal Context Over Documents", which is incorporated by reference in its entirety.

TECHNICAL FIELD

The disclosure generally relates to natural language processing and more specifically to answering natural language questions about a natural language context from a variable set of sentences.

BACKGROUND

The task of textual question answering ("QA"), in which a machine reads a document and answers a question, is an important and challenging problem in natural language processing. Progress in neural QA models is largely due to the variety of available QA datasets.

Conventional neural QA models leverage a bidirectional attention mechanism that builds codependent representations of a document and a question. This is done by learning the context over different parts in the full document. But, learning the full context over the document is challenging and inefficient. This is particularly true when a conventional neural QA model is given a long document or multiple documents. In this case, the conventional neural QA model learning the full context is intractably slow and difficult to scale to large corpora.

Additionally, when conventional neural models are given adversarial inputs, such models tend to focus on wrong subsets of the context and produce incorrect answers as a result.

Accordingly, what is needed is a QA system that is scalable to large documents and is robust to adversarial inputs.

In the figures, elements having the same designations have the same or similar functions.

DETAILED DESCRIPTION

The task of textual question answering ("QA"), in which a machine reads a document and answers a question, is an important and challenging problem in natural language processing. Because learning the full context of a document to answer a question is inefficient, the embodiments describe a QA system that is scalable to large documents and robust to adversarial inputs.

In some embodiments, the QA system may identify most answers to a passage in a document when asked a few questions and without considering an entire document. To identify an answer, a QA system may use a sentence selector. The sentence selector may identify a set of sentences from a document. The set of sentences can be a minimum set of sentences or sentences that have a score above a configurable threshold. The set of sentences from a document may vary from question to question. Once the sentence selector identifies a set of questions, a QA module in the QA system uses the set of sentences to determine an answer to a question.

Figure 1:
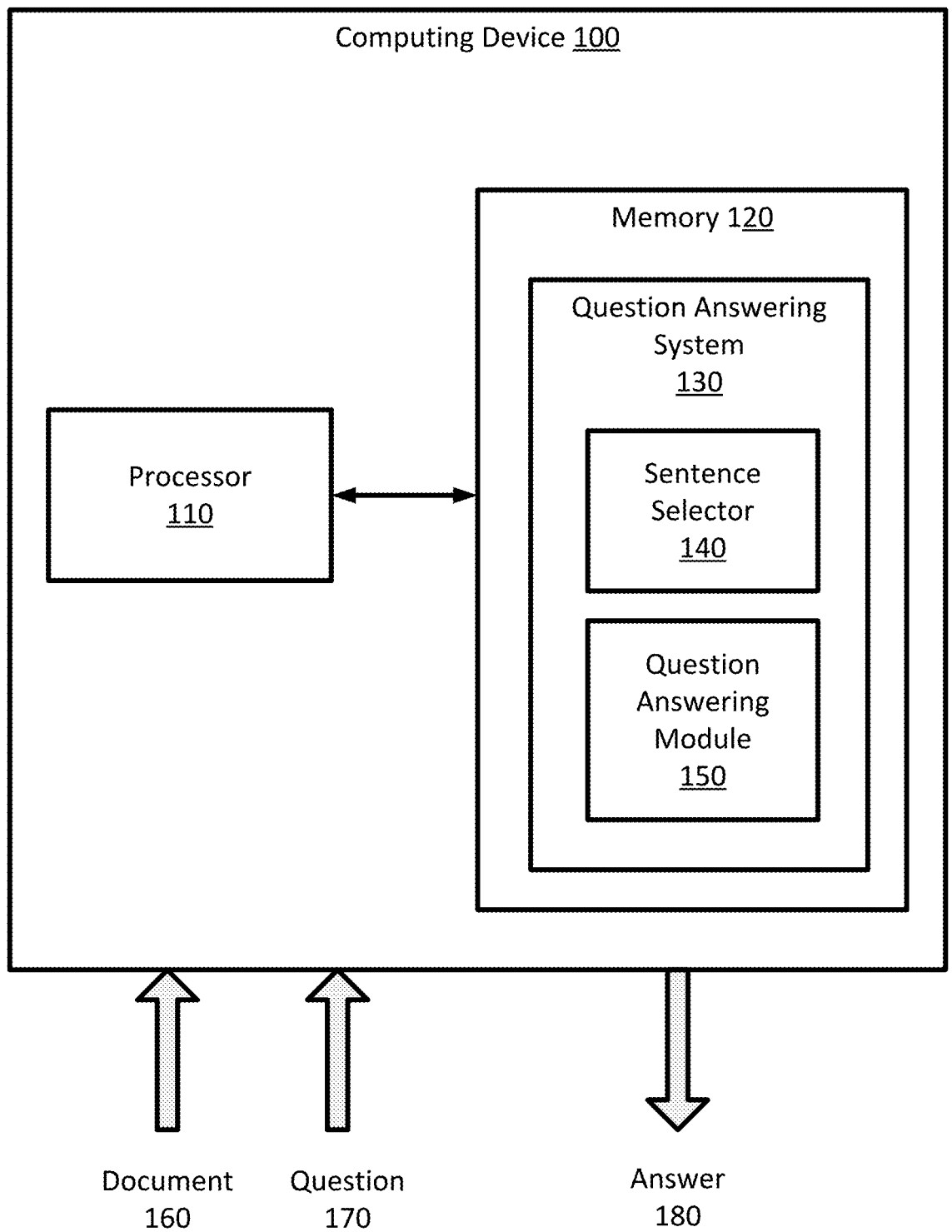
FIG. 1 is a simplified diagram of a computing device, according to some embodiments.

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on the same board, in a same package (e.g., system-in-package), on the same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities. In some examples, memory 120 may include non-transitory, tangible, machine readable media that includes executable code that when run by one or more processors (e.g., processor 110) may cause the one or more processors to perform the question answering methods described in further detail herein.

As illustrated in FIG. 1, memory 120 may include a question answering system 130 (or simply QA system 130). QA system 130 may be implemented using hardware, software, and/or a combination of hardware and software. Unlike conventional question answering systems, QA system 130 receives a natural language document 160 (or simply document 160) and a natural language question 170

(or simply question 170) about document 160. Document 160 may be a portion of a document, one or more paragraphs of a document or an entire document. After QA system 130 receives document 160 and question 170, QA system 130 may generate a natural language answer 180 (or simply answer 180) to question 170 without evaluating the entire document 160. Rather, QA system 130 uses document 160 to generate a variable set of sentences and uses the set of sentences to determine answer 180.

As also illustrated in FIG. 1, computing device 100 may receive document 160 and question 170 and may provide document 160 and question 170 to QA system 130. Once QA system 130 generates an answer 180, QA system 130 may provide answer 180 to computing device 100.

In some embodiments, QA system 130 may include a sentence selector 140 and a QA module 150. Together sentence selector 140 and QA module 150 may be used to implement and/or emulate the models described further herein and/or to implement any of the methods described further herein. In some examples, sentence selector 140 and QA module 150 may receive document 160 and question 170 and generate answer 180. In some examples, sentence selector 140 and QA module 150 may also handle the iterative training and/or evaluation of QA system 130.

Figure 2:
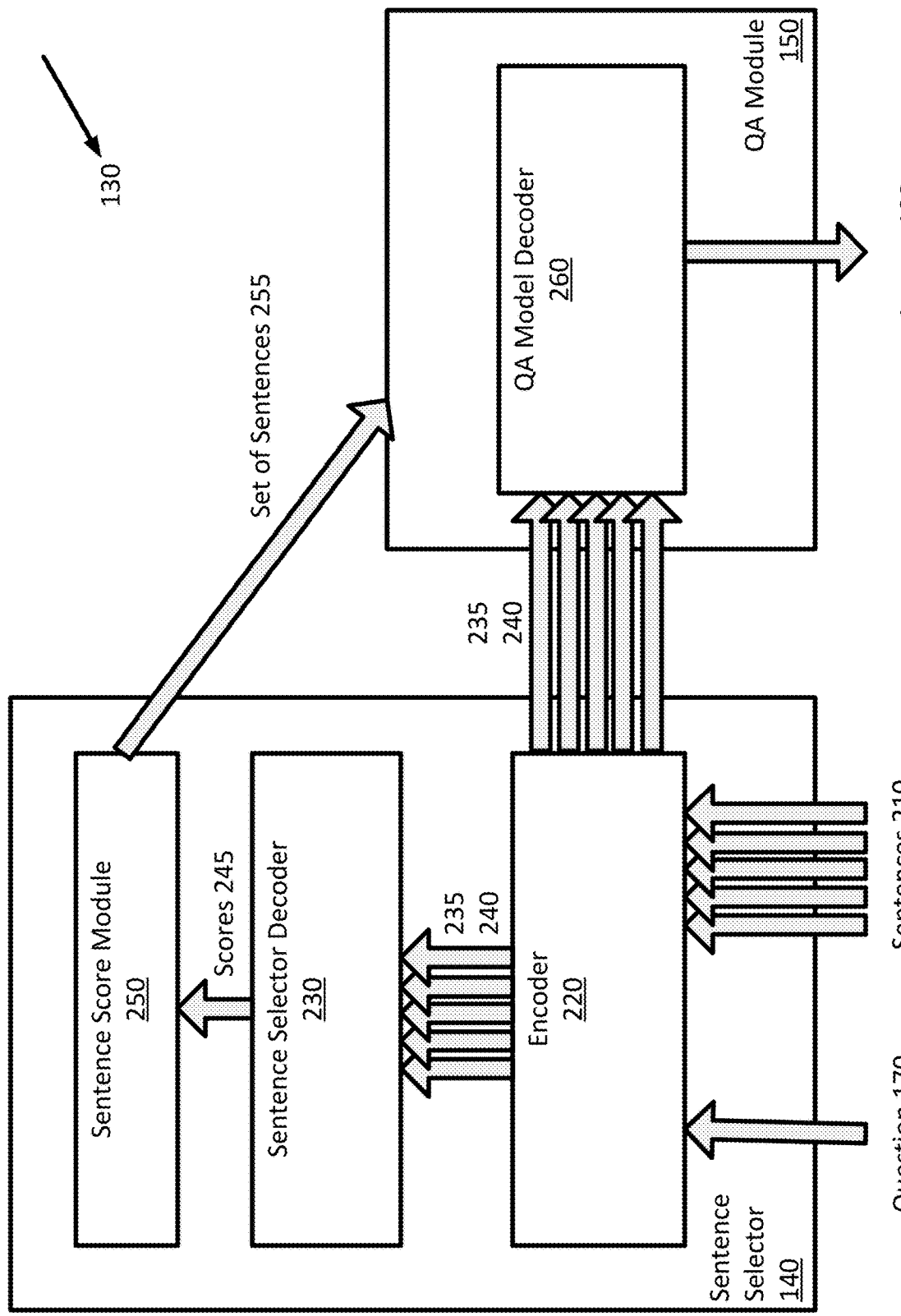
FIG. 2 is a simplified diagram of a question answering system, according to some embodiments.

FIG. 2 is a simplified diagram of the QA system 130, according to some embodiments. As discussed above, QA system 130 may include sentence selector 140 and QA module 150. Sentence selector 140 and QA module 150 may be implemented using neural networks.

In some embodiments, sentence selector 140 may receive question 170 and one or more sentences 210 from document 160. Sentences 210 may be sentences identified from an entire document 160, a portion of document 160, or a particular paragraph, such as a first paragraph, of document 160.

In some embodiments, sentence selector 140 may include an encoder 220 and a decoder 230 (shown as sentence selector decoder 230). Notably, unlike conventional systems, sentence selector 140 shares encoder 220 with QA module 150, which is discussed below.

Figure 3:
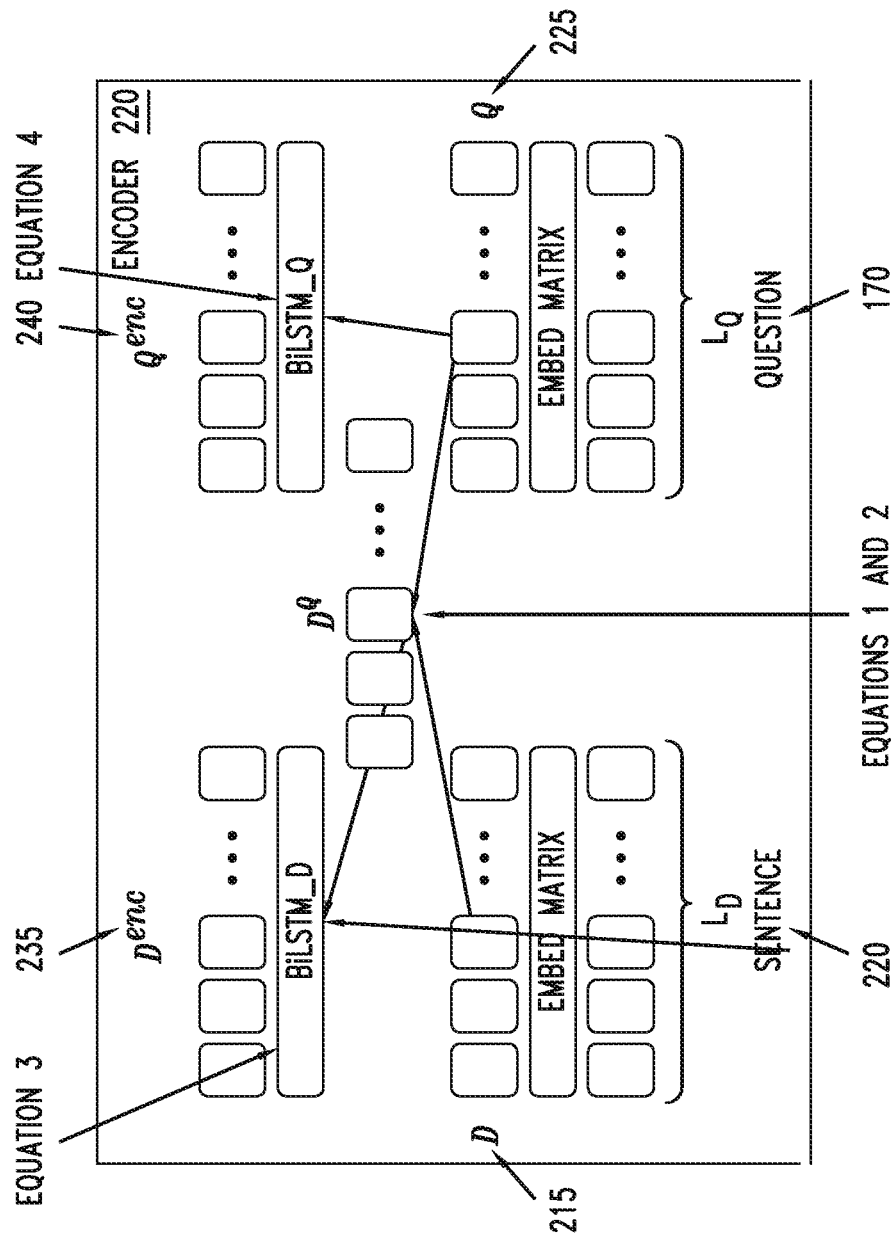
FIG. 3 is a simplified diagram of an encoder in a question answering system, according to some embodiments.

FIG. 3 is a block diagram of encoder 220, according to some embodiments. Encoder 220 may receive question 170 and one or more sentences 210 as inputs. From sentences 210, encoder 220 may determine sentence embeddings $D \in \mathbb{R}^{L_d \times h_d}$ (shown as 215) and from question 170, encoder 220 may determine question embeddings $Q \in \mathbb{R}^{L_q \times h_d}$ (shown as 225). Also, from sentences 210 and question 170, encoder 220 may determine question-aware sentence embeddings $D^q \in \mathbb{R}^{L_d \times h_d}$, and where $h_d$ is the dimension of word embeddings, and $L_d$ is a sequence length of document 160 and $L_q$ is a sequence length of question 170.

In some embodiments, the dimension of the embeddings D may be 600 and h may be 200.

In some embodiments, encoder 220 may generate the question-aware sentence embeddings $D^q$ as illustrated below:

$$\alpha_{i,j} = \mathrm{softmax}_j(D_i^T W_1 Q) \in \mathbb{R}^{L_q} \qquad (\text{Equation 1})$$

$$D_i^q = \Sigma_{j=1}^{L_q}(\alpha_{i,j} Q_j) \in \mathbb{R}^{h_d} \qquad (\text{Equation 2})$$

In some embodiments, $D_i^q \in \mathbb{R}^{h_d}$ may be a hidden state of sentence embeddings for the $i_{th}$ word and $W_1 \in \mathbb{R}^{h_d}$ is a matrix of trainable weights. As illustrated in Equations 1 and 2 above, encoder 220 may generate question-aware sentence embeddings using sentence embeddings D and question embeddings Q.

In some embodiments, encoder 220 may obtain sentence encodings $D^{enc}$ (shown as 235) and question encoding $Q^{enc}$ (shown as 240) using a Bi-Directional Long Short-Term Memory or Bi-LSTM. Bi-STTM is a type of a recurrent neural network that may be used for sequential data. To determine sentence encodings $D^{enc}$ the input to a Bi-LSTM_D may be sentence embeddings D and question-aware sentence embeddings $D^q$. For example, sentence encodings $D^{enc}$ may be generated by solving the following equation:

$$D^{enc} = \mathrm{BiLSTM}([D_i; D_i^q]) \in \mathbb{R}^h \qquad (\text{Equation 3})$$

To determine question encodings $Q^{enc}$ the input to a Bi-LSTM_Q may be question embeddings Q and question-aware sentence embeddings $D^q$. For example, question encodings $Q^{enc}$ may be generated by solving the following equation:

$$Q^{enc} = \mathrm{BiLSTM}(Q_j) \in \mathbb{R}^{h \times L_q} \qquad (\text{Equation 4})$$

In some embodiments, ";" denotes a concatenation of two vectors, and h is a hyper-parameter of the hidden dimension. In some embodiments, hyper-parameter may have a size of 200.

Figure 4:
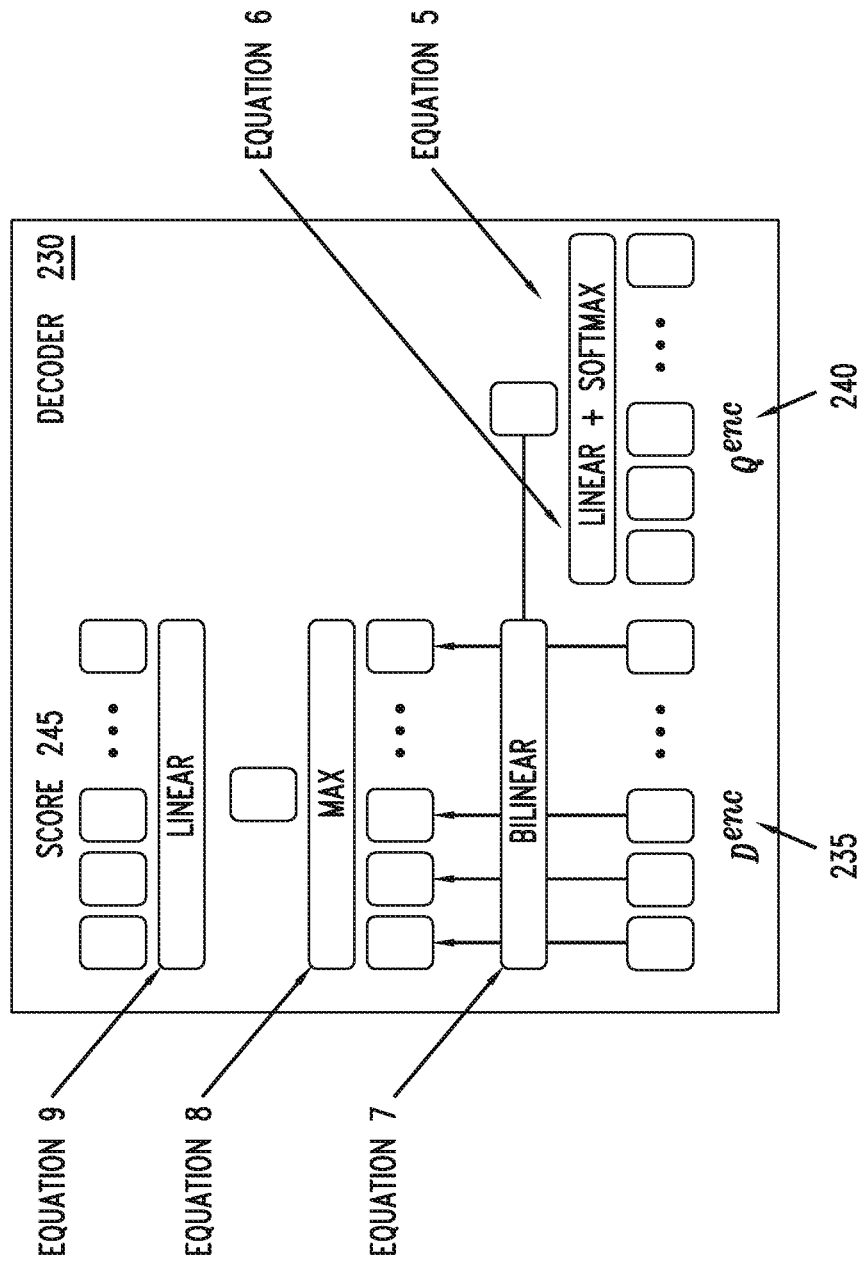
FIG. 4 is a simplified diagram of a decoder in a sentence selector, according to an embodiment.

Going back to FIG. 2, in some embodiments, decoder 230 may compute a score 245 for sentence 210 that indicates whether question 170 is answerable by sentence 210. FIG. 4 is a block diagram of a decoder 230, according to some embodiments. Decoder 230 may determine score 245 by calculating bilinear similarities between sentence encodings $D^{enc}$ and question encodings $Q^{enc}$ as follows:

$$\beta = \mathrm{softmax}(w^T Q^{enc}) \in \mathbb{R}^{L_q} \qquad (\text{Equation 5})$$

$$\bar{q}^{enc} = \Sigma_{j=1}^{L_q}(\beta_j Q_j^{enc}) \in \mathbb{R}^h \qquad (\text{Equation 6})$$

$$\tilde{h}_i = (D_i^{enc} W_2 \bar{q}^{enc}) \in \mathbb{R}^h \qquad (\text{Equation 7})$$

$$\tilde{h} = \max(\tilde{h}_1, \tilde{h}_2, \ldots, \tilde{h}_{L_d}) \qquad (\text{Equation 8})$$

$$\mathrm{score} = W_3^T \tilde{h} \in \mathbb{R}^2 \qquad (\text{Equation 9})$$

In some embodiments, $w \in \mathbb{R}^h$, $W_2 \in \mathbb{R}^{h \times h \times h}$, $W_3 \in \mathbb{R}^{h \times 2}$ may be matrices having trainable weights. In some embodiments, each dimension of the score 245 means question 170 is answerable or not answerable given a particular sentence 210.

In some embodiments, sentence selector 140 may include a normalizer (not shown). Normalizer may be included in decoder 230 after the score is computer in Equation 9 and after the linear layer shown in FIG. 4. A normalizer may normalize scores 245 into normalized scores for sentences 210 from the same paragraph. Typically, normalized scores may have a value from 0 to 1.

Going back to FIG. 2, in some embodiments, sentence selector 140 may include a sentence score module 250. Sentence score module 250 may select sentences 210 into a set of sentences 255 based on scores 245. Set of sentences 255 may include sentences 210 that QA module 150 (described below) may use to determine answer 180 to question 170. In some embodiments, sentence score module 250 may select a minimum number of sentences 210 into set of sentences 255. A minimum number of sentences 210 is a number of sentences 210 that QA module 150 may use to generate answer 180. One way for sentence score module 250 to select a minimum number of sentences 210 is to use a hyper-parameter "th". To select sentences 210 using a hyper-parameter, sentence score module 250 may receive scores 245 for all sentences 210 for document 160 as $S_{all} = \{s_1, s_2, s_3, \ldots, s_n\}$, where $S_{all}$ is ordered according to scores 245 or normalized scores in, for example, a descending order. Next, sentence score module 250 may select sentences to be included in the set of sentences 255 ($S_{selected}$) as follows:

$$S_{candidate} = \{s_i \in S_{all} \mid \text{score}(s_i) \geq 1 - th\} \quad \text{(Equation 10)}$$

$$S_{selected} = \begin{cases} S_{candidate} & \text{if } S_{candidate} = \emptyset \\ \{s_1\} & \text{otherwise} \end{cases} \quad \text{(Equation 11)}$$

In some embodiments where $\text{score}(s_i)$ is a normalized score, the "th" hyper-parameter may be between 0 and 1.

In some embodiments, $S_{candidate}$ includes a set of sentences 210 that have a score greater than a "th" hyper-parameter when the hyper-parameter is subtracted from one as shown in Equation 10. Once sentence score module 250 determines the S candidate set, sentence score module 250 may determine that the S candidate set is not an empty set as shown in Equation 11. If the S candidate set is not an empty set, the S candidate set becomes the set of sentences 255 which is $S_{selected}$ in Equation 11. Otherwise if S candidate set is an empty set, sentence score module 250 may include a first sentence $s_1$ in the $S_{all}$. In this case, if sentences 210 in the $S_{all}$ set are included by scores in the descending order, sentence score module 250 may select sentence $s_1$, which has the highest score into the $S_{selected}$.

When the minimum set of sentences 255 uses a hyper-parameter, the size of set of sentences 255 may be dynamically controlled at an inference time by adjusting the value of the th hyper-parameter between 0 and 1. In this way, a number of sentences 210 that sentence selector 140 may select to answer question 170 may vary depending on the needs of accuracy and speed of QA system 130.

In some embodiments, sentence score module 250 may use a configurable threshold to select one or more sentences 210. For example, sentence score module 250 may select sentences 210 with scores 245 above a configurable threshold.

Figure 5:
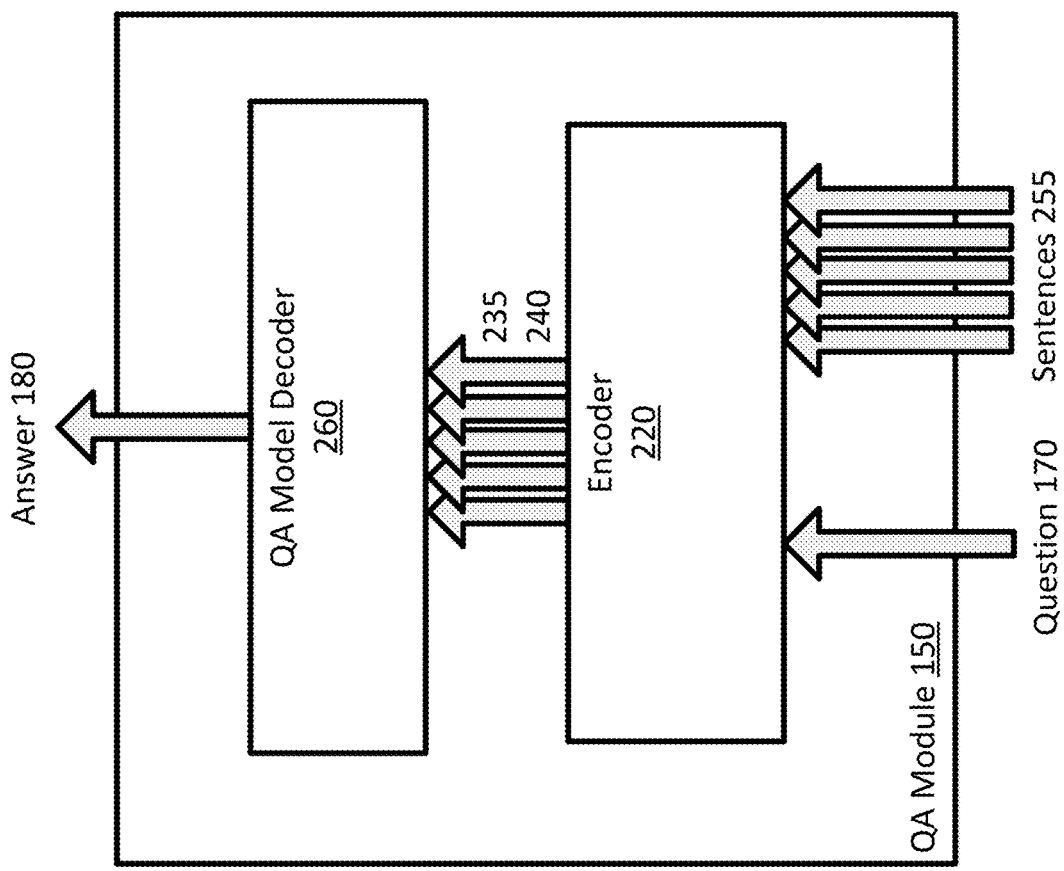
FIG. 5 is a simplified diagram of a question answering model, according to an embodiment.

Going back to FIG. 2, in some embodiments, architecture for QA module 150 may be divided into encoder 220 and a QA model decoder 260 or simply decoder 260. Notably, QA module 150 may include encoder 220 that is included in sentence selector 140. FIG. 5 is a block diagram of QA module 150 according to some embodiments. As illustrated in FIG. 5, instead of receiving sentences 210 from document 160, encoder 220 may receive set of sentences 255 generated by sentence selector 140 and question 170. Using set of sentences 255 and question 170, encoder 220 may generate document embeddings $D \in \mathbb{R}^{L_d \times h_d}$ (shown as 215), question embeddings $Q \in \mathbb{R}^{L_d \times h_d}$ (shown as 225) and question-aware document embeddings $D^q \in \mathbb{R}^{L_d \times h_d}$, where $D^q$ may be defined as in Equation 1. In some embodiments, encoder 220 may obtain sentence encodings $D^{enc}$ (shown as 235) and question encodings $Q^{enc}$ (shown as 240) as shown in FIG. 3. Encoder 220 may pass document encodings $D^{enc}$ and question encodings $Q^{enc}$ to QA Model decoder 260 (or simply decoder 260).

Figure 6:
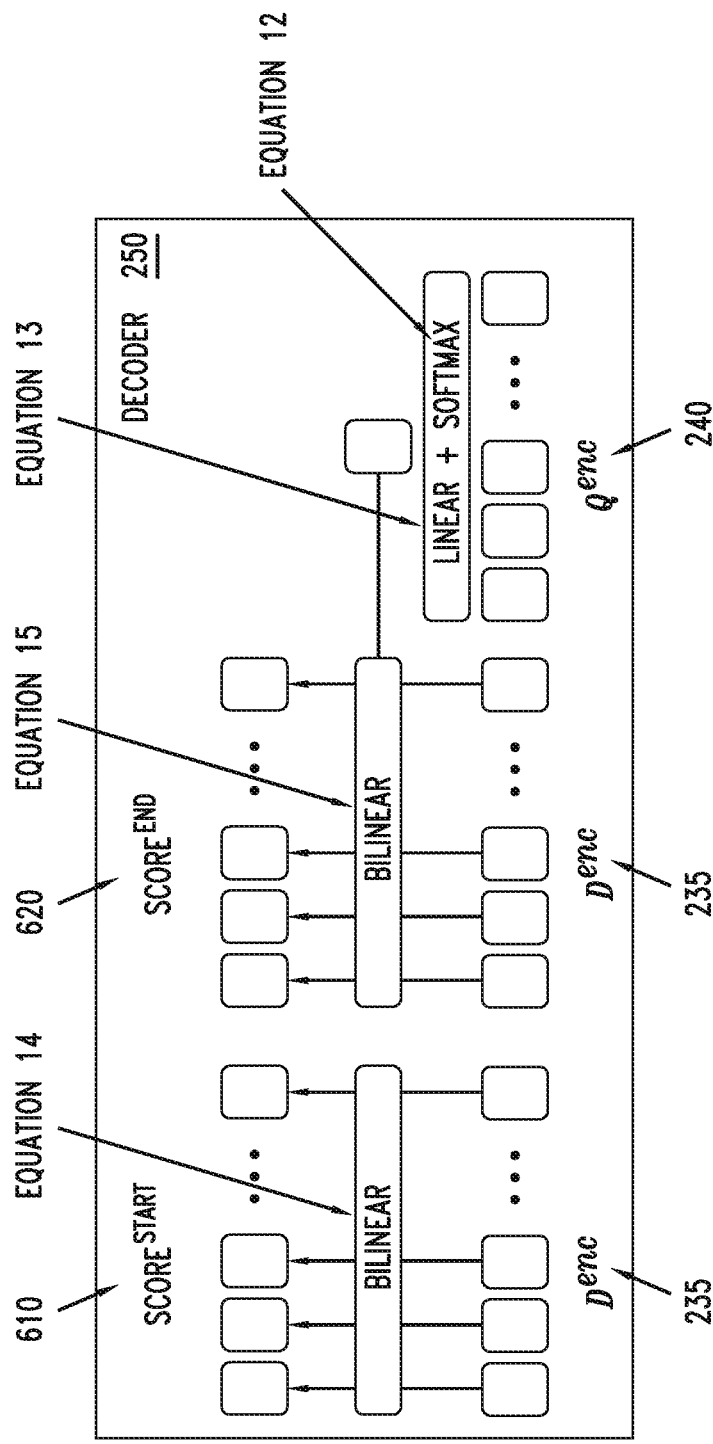
FIG. 6 is a simplified diagram of a decoder in a question answering model, according to some embodiments.

Going back to FIG. 2, in some embodiments, decoder 260 may obtain the scores for an answer span to question 170. FIG. 6 is a block diagram of decoder 260, according to some embodiments. Decoder 260 may determine scores for the start position 610 and the end position 620 of an answer span by calculating bilinear similarities between document encodings $D^{enc}$ and question encodings $Q^{enc}$ as follows:

$$\beta = \text{softmax}(w_1^T Q^{enc}) \in \mathbb{R}^h \quad \text{(Equation 12)}$$

$$\bar{q}^{enc} = \sum_{j=1}^{L_q} (\beta_j Q_j^{enc}) \in \mathbb{R}^h \quad \text{(Equation 13)}$$

$$\text{score}^{start} = D^{enc} W_{start} \bar{q}^{enc} \in \mathbb{R}^{L_d} \quad \text{(Equation 14)}$$

$$\text{score}^{end} = D^{enc} W_{end} \bar{q}^{enc} \in \mathbb{R}^{L_d} \quad \text{(Equation 15)}$$

where $w_1 \in \mathbb{R}^h$, $W_{start}$, $W_{end} \in \mathbb{R}^{h \times h}$ are matrices that have trainable weights. The start position 610 and end position 620 may identify answer 180 to question 170.

Figure 7:
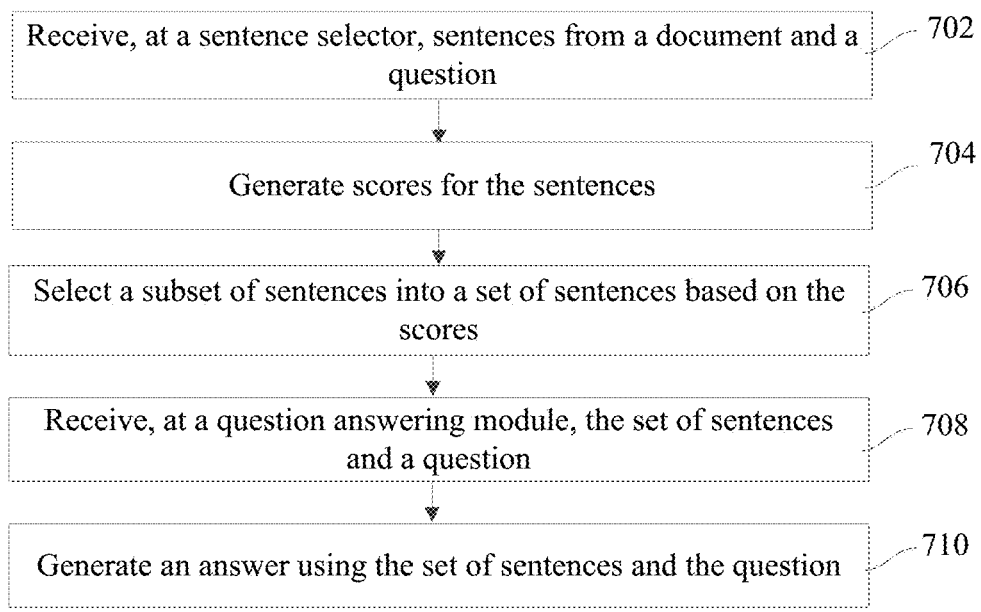
FIG. 7 is a flowchart for generating an answer to a question, according to some embodiments.

FIG. 7 is a flowchart of a method for answering a question, according to some embodiments. One or more of the processes 702-710 of method 700 may be implemented, at least in part, in the form of executable code stored on non-transitory, tangible, machine-readable media that when run by one or more processors may cause the one or more processors to perform one or more of the processes 702-710.

At operation 702, a question and one or more sentences are received. For example, sentence selector 140 receives question 170 and one or more sentences 210 from document 160.

Figure 8:
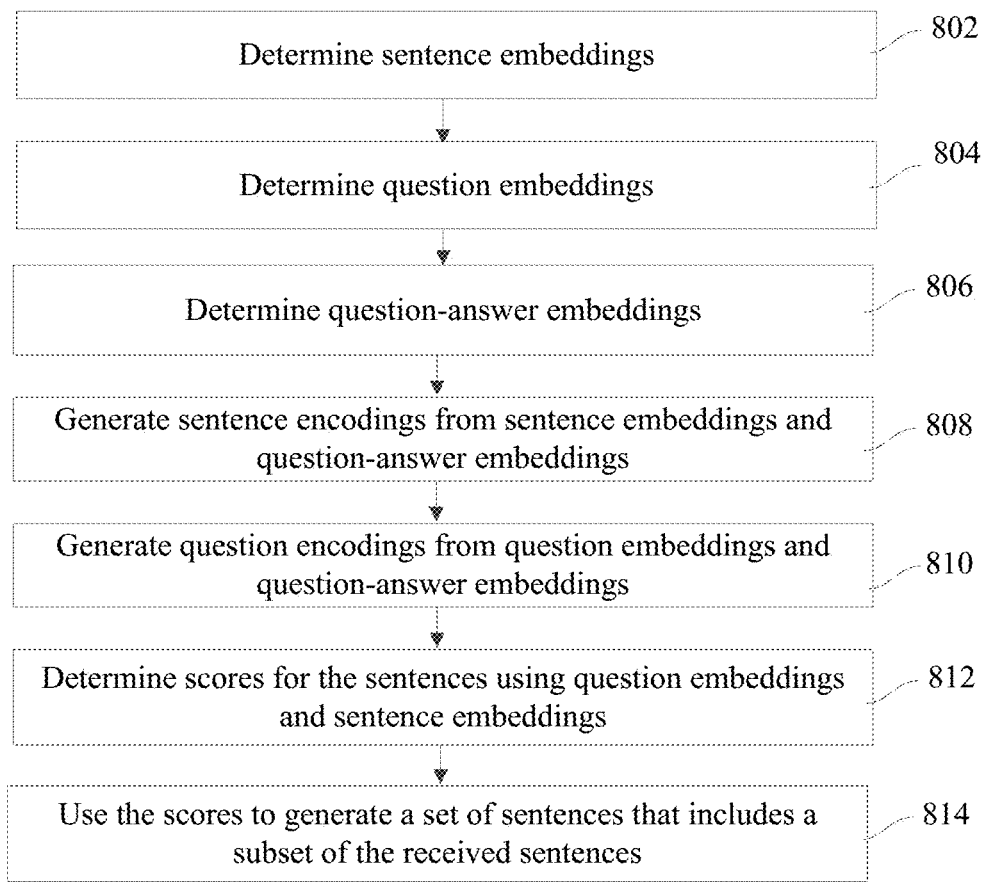
FIG. 8 is a flowchart of a method for determining a set of sentences, according to some embodiments.

At operation 704, scores for the one or more sentences are generated. For example, encoder 220 and decoder 230 included in sentence selector 140 generate scores 245 for one or more sentences 210. FIG. 8 is flowchart that describes how scores are generated according to some embodiments and is described below.

At operation 706, a set of scores is generated. For example, sentence score module 250 included in sentence selector 140 may select a subset of sentences 210 into set of sentences 255. In some embodiments, set of sentences 255 may be based on a hyper-parameter. In some embodiments, set of sentences may include scores 245 that are above a configurable threshold.

At operation 708, the set of sentences and a question are received. For example, QA module 150 may receive set of sentences 255 and question 170.

At operation 710, an answer is generated. For example, encoder 220 that QA module 150 may share with sentence selector 140 and decoder 260 may generate answer 180 from set of sentences 255.

FIG. 8 is a flowchart of a method for determining a set of sentences, according to some embodiments. One or more of the processes 802-814 of method 800 may be implemented, at least in part, in the form of executable code stored on non-transitory, tangible, machine-readable media that when run by one or more processors may cause the one or more processors to perform one or more of the processes 802-814.

At operation 802, sentence embeddings are determined. For example, encoder 220 determines sentence embeddings D using dimension of word embeddings and sequence length of document 160.

At operation 804, question embeddings are determined. For example, encoder 220 determines question embeddings Q using dimension of word embeddings and sequence length of question 170.

At operation 806, question-aware sentence embeddings are determined. For example, encoder 220 determines question-aware sentence embeddings $D^q$ using sentence embeddings D and question embeddings Q.

At operation 808, sentence encodings are generated. For example, encoder 220 generates sentence encodings $D^{enc}$ from sentence embeddings $D^q$ and question-answer sentence embeddings $D^q$.

At operation 810, question encodings are generated. For example, encoder 220 generates question encodings $Q^{enc}$ from sentence embeddings $D^q$ and question-answer sentence embeddings $D^q$.

At operation 812, scores for sentences are determined. For example, decoder 230 determines scores 245 for sentences 210.

At operation 814, a set of sentences is determined. For example, sentence score module 250 uses scores 245 to determine sentences 210 to be included in set of sentences 255. As discussed above, set of sentences 255 may include a minimum set of sentences that QA module 150 may use to determine answer 180 or a number of sentences 210 that have scores 245 above a threshold.

Figure 9:
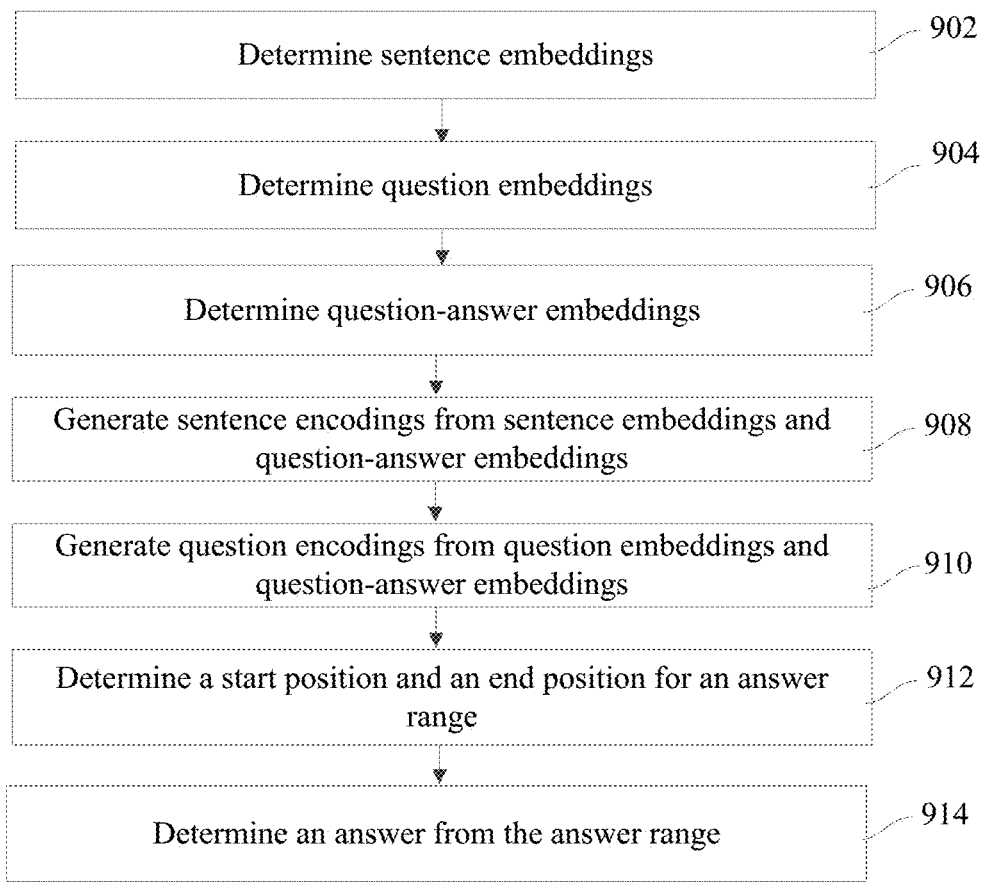
FIG. 9 is a flowchart of a method for answering a question, according to some embodiments.

FIG. 9 is a flowchart of a method for answering a question, according to some embodiments. One or more of the processes 902-914 of method 900 may be implemented, at least in part, in the form of executable code stored on non-transitory, tangible, machine-readable media that when run by one or more processors may cause the one or more processors to perform one or more of the processes 902-914.

At operation 902, sentence embeddings are determined. For example, encoder 220 determines sentence embeddings D using dimension of word embeddings and sequence length of sentences 210 in set of sentences 255.

At operation 904, question embeddings are determined. For example, encoder 220 determines question embeddings Q using dimension of word embeddings and sequence length of question 170.

At operation 906, question-aware sentence embeddings are determined. For example, encoder 220 determines question-aware sentence embeddings $D^q$ using sentence embeddings D and question embeddings Q.

At operation 908, sentence encodings are generated. For example, encoder 220 generates sentence encodings $D^{enc}$ from sentence embeddings $D^q$ and question-answer sentence embeddings $D^q$.

At operation 910, question encodings are generated. For example, encoder 220 generates question encodings $Q^{enc}$ from sentence embeddings $D^q$ and question-answer sentence embeddings $D^q$.

At operation 912, determine a start position and an end position for an answer. For example, decoder 260 uses sentence encodings $D^{enc}$ and $Q^{enc}$ and question encodings to generate start position 610 and end position 620 for answer 180 to question 170.

At operation 914, an answer is identified. For example, decoder 260 uses start position 610 and end position 620 to identify answer 180.

Going back to FIG. 2, in some embodiments, there may be several techniques to train sentence selector 140. In the first technique, QA module 150 may be trained on a single oracle sentence and weights from QA model trained on a single oracle sentence may be incorporated into encoder 220. An oracle sentence may be a sentence that includes a ground truth answer span. In the second technique, training data may be modified if sentence 210 receives a score of zero. In a third technique, score 245 for each sentence 210 may be normalized across sentences 210 from the same paragraph. Typically, a normalized score may be from 0 to 1.

In some embodiments, training data may be data from one or more existing QA datasets. The various data sets are discussed in the "Efficient and Robust Question Answering from Minimal Context over Documents," Sewon Min, et. al, which is incorporated by reference in its entirety. Example datasets may be a SQuAD dataset from a large set of Wikipedia articles. The SQuAD dataset may provide a paragraph for each question 170. Another example of a dataset may be a NewsQA dataset that includes a large set of news articles and also provides a paragraph for each question 170. Typically, paragraphs in NewsQA dataset are longer than paragraphs in a SQuAD dataset. Another example of a dataset is a TriviaQA dataset that includes a large set of Wikipedia articles and web documents. In a TriviaQA dataset, each question 170 is given a longer context in the form of multiple documents. In yet another example, a dataset may be an open domain question answering dataset based on SQuAD. In a SQuAD-Open dataset, only the question and the answer may be given, and a model may identify the relevant context from the English Wikipedia articles or Wikipedia articles written in another language. In yet another embodiment, a SQuAD-Adversarial dataset may be another variant of a SQuAD dataset. For example, the SQuAD-Adversarial dataset shares the same training set as SQuAD, but also has an adversarial sentence that is added to each paragraph in a sub set of a development set. Table 1 below illustrates example datasets that may be used to train question answering system:

TABLE 1

| Dataset | Domain | N word | N sent | Ndoc | Supervision |
|---|---|---|---|---|---|
| SQuAD | Wikipedia | 155 | 5 | — | Span |
| NewsQA | News Articles | 803 | 20 | — | Span |
| TriviaQA (Wikipedia) | Wikipedia | 11202 | 488 | 2 | Distant |
| SQuAD-Open | Wikipedia | 120734 | 4488 | 10 | Distant |
| SQuAD-Adversarial-AddSent | Wikipedia | 169 | 6 | — | Span |
| SQuAD-Adversarial-AddOneSent | Wikipedia | 165 | 6 | — | Span |

In the Table 1 above, "N word" may refer to the average number of words in document 160, "N sent" may refer to an average number of sentences in document 160, and "N doc" may refer to an average number of documents 160.

In some embodiments, several conventional QA models may be compared to QA system 130. Example conventional QA models may include a conventional full document model, a conventional oracle sentence containing the ground truth answer span model, and a conventional TF-IDF which is also discussed in the "Efficient and Robust Question Answering from Minimal Context over Documents," which is incorporated by reference in its entirety. Results of a TF-IDF model against QA system 130 are replicated below in Table 2. Additionally, results illustrate QA system 130 where sentence score module 250 may select set of sentences 255 using a hyper-parameter in which case a number of sentences 210 in set of sentences 225 may vary from question to question. Also, results may illustrate a QA system 130 where sentence score module 250 may select set of sentences 255 using a preconfigured threshold, in which case set of sentences 255 may include sentences 210 with scores above the threshold.

With respect to the SQuAD and NewsQA datasets, Table 2 illustrates that question answer system 130 has a higher accuracy and mean average accuracy for determining answer 180 from document 160 and question 170, than the conventional TF-IDF system, and the Tan system discussed in the "Efficient and Robust Question Answering from Minimal Context over Documents,", which is considered to be a state-of-the art system:

TABLE 2

| | SQuAD | | NewsQA | | |
|---|---|---|---|---|---|
| Model | Top 1 | MAP | Top 1 | Top 3 | MAP |
| TF-IDF | 81.2 | 89.0 | 49.8 | 72.1 | 63.7 |
| Our selector | 85.8 | 91.6 | 63.2 | 85.1 | 75.5 |
| Our selector (T) | 90.0 | 94.3 | 67.1 | 87.9 | 78.5 |
| Our selector (T + | 91.2 | 95.0 | 70.9 | 89.7 | 81.1 |

TABLE 2-continued

| Model | SQuAD | | NewsQA | | |
|---|---|---|---|---|---|
| | Top 1 | MAP | Top 1 | Top 3 | MAP |
| M, T + M + N) Tan et al. (2018) | — | 92.1 | — | — | — |

In some embodiments, the "T", "M", and "N" in Table 2 identify different training techniques discussed above: "T" is a weight transfer technique, "M" is a data modification technique, and "N" is the score normalization technique.

With respect to a SQuAD dataset, QA system 130 is more accurate than the conventional full document model. Table 3 illustrates three questions 170 (in italicized text), document 160, and the answers that QA system 130 and conventional model system determined from document 160 and question 170.

TABLE 3

The initial LM model weighed approximately 33,300 pounds, and allowed surface stays up to around 34 hours.
. . .
An Extended Lunar Module weighted over 36,000 pounds, and allowed surface stays of over 3 days. ✓
*For about how long would the extended LM allows a surface stay on the moon?*
Approximately 1,000 British soldiers were killed or injured. ✓
. . .
The remaining 500 British soldiers, led by George Washington, retreated to Virginia.
*How many casualties did British get?*
This book, which influenced the thought of Charles Darwin successfully promoted the doctrine of uniformitarianism.
This theory states that slow geological processes have occurred throughout the Earth's history and are still occurring today. ✓
In contrast, catastrophism is the theory that Earth's features formed in single, catastrophic events and remained unchanged thereafter. ✓
*Which theory states that slow geological processes are still occurring today, and have occurred throughout Earth's history?*

As illustrated in Table 3, QA system 130 selects a correct answer (underlined). The checkmarks (✓) indicate sentences 210 that QA system 130 selected to answer the above questions. Further, given the same questions and text, the conventional full document model does not select a correct answer (bold).

This application is further described with respect to the attached document ("Efficient and Robust Question Answering from Minimal Context over Documents," 16 pp), which is considered part of this disclosure and the entirety of which is incorporated by reference.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for natural language processing, the system comprising:
a memory configured to store a neural network sentence selector and a neural network question answering module;
the neural network sentence selector configured to:
receive a question and a plurality of sentences that represent a single document;
determine a plurality of scores, one score in the plurality of scores for one sentence in the plurality of sentences, wherein the plurality of scores represent whether the question is answerable using a subset of sentences in the plurality of sentences;
generate a minimum set of sentences from the plurality of sentences and the plurality of scores, wherein at least one sentence from the plurality of sentences is included in the minimum set of sentences when a corresponding at least one score in the plurality of scores is greater than a value indicated by a hyperparameter; and
the neural network question answering module configured to generate an answer from the minimum set of sentences and the question.

2. The system of claim 1, further comprising:
an encoder in the neural network sentence selector, the encoder configured to:
determine sentence embeddings from the plurality of sentences;
determine question embeddings from the question;
determine question-aware embeddings from the sentence embeddings and the question embeddings;
generate sentence encodings from the sentence embeddings and the question-aware embeddings;
generate question encodings from the question embeddings and the question-aware embeddings; and
a decoder in the neural network sentence selector, the decoder configured to determine the plurality of scores using the sentence encodings and the question encodings.

3. The system of claim 2, wherein the neural network question answering module is further configured to:
receive the minimum set of sentences and the question;
generate second sentence encodings and second question encodings from the minimum set of sentences and the question; and
determine, using the second sentence encodings and the second question encodings, an answer range for the answer to the question.

4. The system of claim 3, further comprising a second encoder in the neural network question answering module, the second encoder configured to:
determine second sentence embeddings from sentences in the minimum set of sentences;
determine second question embeddings from the question;
determine second question-aware embeddings from the second sentence embeddings and the second question embeddings;
generate the second sentence encodings from the second sentence embeddings and the second question-aware embeddings; and
generate the second question encodings from the second question embeddings and the second question-aware embeddings.

5. The system of claim 4, wherein the encoder in the neural network sentence selector and the encoder in the neural network question answering module is the same encoder.

6. The system of claim 1, wherein a size of the minimum set of sentences varies between the question and another question.

7. The system of claim 1, wherein a size of the minimum set of sentences includes at least one sentence in the plurality of sentences with a score from the plurality of scores above a threshold.

8. A method for natural language processing, the method comprising:
receiving a question and a plurality of sentences that represent a single document at a neural network sentence selector;
determining, using the neural network sentence selector executing on a processor, a plurality of scores for the plurality of sentences, one score in the plurality of scores corresponding to one sentence in the plurality of sentences, wherein the plurality of scores represent whether the question is answerable using the plurality of sentences;
generating, using the neural network sentence selector, a minimum set of sentences from the plurality of sentences and the plurality of scores, by including at least one sentence from the plurality of sentences into the minimum set of sentences when a corresponding at least one score in the plurality of scores is greater than a value indicated by a hyper-parameter; and
generating, using a neural network question answering module, an answer from the minimum set of sentences and the question.

9. The method of claim 8, further comprising:
determining sentence embeddings from the plurality of sentences;
determining question embeddings from the question;
determining question-aware embeddings from the sentence embeddings and the question embeddings;
generating sentence encodings from the sentence embeddings and the question-aware embeddings;
generating question encodings from the question embeddings and the question-aware embeddings; and
determining the plurality of scores using the sentence encodings and the question encodings.

10. The method of claim 8, further comprising:
receiving the minimum set of sentences and the question;
generating second sentence encodings and second question encodings from the minimum set of sentences and the question; and
determining, using the second sentence encodings and the second question encodings, an answer range for the answer to the question.

11. The method of claim 10, further comprising:
determining second sentence embeddings from sentences in the minimum set of sentences;
determining second question embeddings from the question;
determining second question-aware embeddings from the second sentence embeddings and the second question embeddings;
generating the second sentence encodings from the second sentence embeddings and the second question-aware embeddings; and
generating the second question encodings from the second question embeddings and the second question-aware embeddings.

12. The method of claim 8, wherein a size of the minimum set of sentences varies between the question and another question.

13. The method of claim 8, wherein a size of the minimum set of sentences includes at least one sentence in the plurality of sentences with a score from the plurality of scores above a threshold.

14. A non-transitory machine-readable medium having stored thereon machine-readable instructions executable to cause a machine to perform operations that process a natural language, the operations comprising:
receiving, at a neural network sentence selector, a question and a plurality of sentences that represent a single document;
determining a plurality of scores that correspond to the plurality of sentences, one score per sentence, wherein a subset of scores in the plurality of scores represent whether the question is answerable using a subset of sentences in the plurality of sentences;
generating a minimum set of sentences from the plurality of scores and the plurality of sentences, wherein a predefined number of highest scoring sentences from the plurality of sentences are selected into the minimum set of sentences; and
generating, at a neural network question answering module an answer to the question from the minimum set of sentences and the question.

15. The non-transitory machine-readable medium of claim 14, wherein to determine the plurality of scores, the machine is further configured to perform the operations comprising:
determining sentence embeddings from the plurality of sentences;
determining question embeddings from the question;
determining question-answer embeddings from the sentence embeddings and the question embeddings;
generating sentence encodings from the sentence embeddings and question-aware embeddings;
generating question encodings from the question embeddings and the question-aware embeddings; and
determining the plurality of scores using the sentence encodings and the question encodings.

16. The non-transitory machine-readable medium of claim 15, wherein the machine is further configured to perform the operations comprising:
receiving the minimum set of sentences and the question;
generating second sentence encodings and second question encodings from the minimum set of sentences and the question; and
generating, using the second sentence encodings and the second question encodings, an answer range for the answer of the question.

17. The non-transitory machine-readable medium of claim 16, wherein the machine is further configured to perform the operations comprising:
determining second sentence embeddings from sentences in the minimum set of sentences;
determining second question embeddings from the question;
determining second question-aware embeddings from the second sentence embeddings and the second question embeddings;
generating the second sentence encodings from the second sentence embeddings and the second question-aware embeddings; and
generating the second question encodings from the second question embeddings and the second question-aware embeddings.

18. The non-transitory machine-readable medium of claim 14, wherein a size of the minimum set of sentences varies between the question and another question.

19. The non-transitory machine-readable medium of claim 14, wherein a size of the minimum set of sentences includes at least one sentence in the plurality of sentences with a score from the plurality of scores above a threshold.

20. The non-transitory machine-readable medium of claim 14, wherein the plurality of sentences are sentences from a portion of the document.

\* \* \* \* \*